(12) United States Patent
Campbell et al.

(10) Patent No.: US 7,747,985 B2
(45) Date of Patent: Jun. 29, 2010

(54) CONFORMANCE TESTING OF MULTI-THREADED AND DISTRIBUTED SOFTWARE SYSTEMS

(75) Inventors: Colin L. Campbell, Seattle, WA (US); Lev Borisovich Nachmanson, Redmond, WA (US); Margus Veanes, Bellevue, WA (US); Michael Barnett, Seattle, WA (US); Nikolai Tillmann, Redmond, WA (US); Wolfgang Grieskamp, Redmond, WA (US); Wolfram Schulte, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 949 days.

(21) Appl. No.: 11/085,624

(22) Filed: Mar. 18, 2005

(65) Prior Publication Data

US 2006/0212759 A1 Sep. 21, 2006

(51) Int. Cl.
*G06F 9/44* (2006.01)
(52) U.S. Cl. ...................................... 717/127
(58) Field of Classification Search ......... 717/104–105, 717/124–135
See application file for complete search history.

(56) References Cited

U.S. PATENT DOCUMENTS

| 5,389,838 | A | 2/1995 | Orengo |
| 5,913,061 | A | 6/1999 | Gupta et al. |
| 6,038,378 | A | 3/2000 | Kita et al. |
| 6,973,638 | B1 | 12/2005 | Gangopadhyay et al. |
| 6,993,706 | B2 | 1/2006 | Cook |
| 7,076,417 | B2 | 7/2006 | Jain et al. |
| 7,088,864 | B2 | 8/2006 | Grieskamp et al. |
| 2003/0121027 | A1 * | 6/2003 | Hines ......................... 717/135 |
| 2005/0160404 | A1 | 7/2005 | Nachmanson et al. |
| 2006/0214948 | A1 | 9/2006 | Murthy |

OTHER PUBLICATIONS

Fidge, "Partial Orders for Parallel Debugging", 1988, ACM, pp. 183-194.*
Henniger et al., "Automatic Generation of Test Purposes for Testing Distributed Systems", Feb. 2004, SpringerLink, pp. 178-191.*
Krasucki et al., "Knowledge and the Ordering of Events in Distributed Systems Extended Abstract", 1994, ACM, pp. 267-283.*
Barnett et al., "The Spec# Programming System: An Overview," CASSIS 2004, LNCD 3362, pp. 49-69, 2005.
Barnett et al., Towards a Tool Environment for Model-Based Testing with AsmL, In 3rd International Workshop on Formal Approaches to Testing of Software (FATES 2003), Oct. 2003, 9 pages.

(Continued)

*Primary Examiner*—Ted T Vo
(74) *Attorney, Agent, or Firm*—Klarquist Sparkman, LLP (57) ABSTRACT

Techniques and tools for testing multi-threaded or distributed software systems are described. For example, a multi-threaded system is instrumented and executed to produce logs of events that are performed by each of its agents. The agent logs contain a totally ordered series of events per agent, as well as information about accesses to resources shared between the agents. With this information, a partial ordering of the events performed by all the agents is described for the execution. The agent logs are then multiplexed into one or more serialized event orderings, which can then be compared to a specification of the system in a conformance testing engine.

17 Claims, 8 Drawing Sheets

OTHER PUBLICATIONS

Best Paper Award issued by Concordia University for "Multiplexing of Partially Ordered Events," at the IFIP Testcom 2005 in Montreal, Canada, May/Jun. 2005, 1 page.

Blass et al., "Play to test," Technical Report MSR-TR-2005-04, Microsoft Research, 15 pages, Jan. 2005.

Cacciari et al., "Controllability and observability in distributed testing," *Information and Software Technology*, 41, pp. 767-780, 1999.

De Alfaro, "Game Models for Open Systems," *Verification: Theory and Practice: Essays Dedicated to Zohar Manna on the Occasion of His $64^{th}$ Birthday*, vol. 2772 of LNCS, pp. 269-289, 2004.

De Alfaro et al, "Interface Automata," *Proceedings of the $8^{th}$ European Software Engineering Conference held jointly with $9^{th}$ ACM SIGSOFT International Symposium on Foundations of Software Engineering*, vol. 26(5) of *ACM SIGSOFT Software Engineering Notes*, ACM Press, pp. 109-120, 2001.

Grieskamp et al., "Instrumenting scenarios in a model-driven development environment," *Information and Software Technology*, 46(15), pp. 1027-1036, Dec. 2004.

Gurevich et al., "Semantic Essence of AsmL: Extended Abstract," *Formal Methods for Components and Objects, Second International Symposium, FMCO 2003*, vol. 3188 of LNCS, pp. 240-259, 2004.

Hallal et al., "Antipattern-based Detection of Deficiencies in Java Multithreaded Software," *Proceedings of the Fourth International Conference on Quality Software (QSIC2004)*, 10 pages, 2004.

Hallal et al., "An Automata-based Approach to Property Testing in Event Traces," *Proceedings of the IFIP TC6/WG6.1 XV International Conference on Testing of Communicating Systems (TestCom 2003)*, vol. 2644 of LNCS, pp. 180-196, 2003.

Hoare, "An Axiomatic Basis for Computer Programming," Communications of the ACM, vol. 12, No. 10, 1969, pp. 576-583.

Huo et al., "On Testing Partially Specified IOTS through Lossless Queues," *Proceedings of the $16^{th}$ IFIP International Conference, TestCOM 2004*, vol. 2978 of LNCS, pp. 76-94, 2004.

King, "Symbolic Execution and Program Testing," Communications of the ACM, vol. 19, No. 7, 1976, pp. 385-394.

Petrenko et al., "Testing Transition Systems with Input and Output Testers," TestCom 2003, pp. 129-145.

Tasiran et al., "Runtime Refinement Checking of Concurrent Data Structures," *Electronic Notes in Theoretical Computer Science, Proceedings of the Fourth Workshop on Runtime Vertification*, 113:163-179, 2004.

Tretmans et al., "TorX: Automated Model-Based Testing," Editors: A. Hartman and K. Dussa-Ziegler, First European Conference on Model-Driven Software Engineering, Nuremberg, 2003, 13 pages.

Veanes et al., "On-The-Fly Testing of Reactive Systems," Technical Report MSR-TR-2005-05, Microsoft Research, 16 pages, Jan. 2005.

Visser et al. "Test Input Generation with Java PathFinder," ISSTA '04, Jul. 11-14, 2004, Boston, Massachusetts, pp. 97-107.

Campbell, et al., "Multiplexing of Partially Ordered Events," *TestCom 2005*, LNCS 3502, pp. 97-110, 2005.

Lamport, "Time, Clocks, and the Ordering of Events in a Distributed System," *Communications of the ACM*, vol. 21, No. 7, pp. 558-565, Jul. 1978.

Bekkerman, "FSMGenerator Finite State Machine generating software," copyright 2002-2003, retrieved from "http://fsmgenerator.sourceforge.net/" on Feb. 28, 2008, 19 pages.

Quinton and Verjus, "Distributed Synchronization of Parallel Programs: Why and How?," *Proceedings of the International Workshop on Parallel Algorithms and Architectures*, Luminy, France, Apr. 14-18, 1986, 17 pages.

\* cited by examiner

CONFORMANCE TESTING OF MULTI-THREADED AND DISTRIBUTED SOFTWARE SYSTEMS

TECHNICAL FIELD

The present application relates generally to the testing of multi-threaded and distributed software systems.

BACKGROUND

An important part of the development of software systems is testing. Because software systems can involve millions of lines of source code in separate modules or routines which must interact, testing is necessary before a system can be shipped, so as to confirm that a given system performs as expected under various configurations and with various inputs. This complexity is only increased in the case of distributed systems or multi-threaded systems, which evidence separately-executing threads or agents. Because these threads or agents may execute in different orders or on completely different machines or processors, interactions between the threads or agents are typically more complex than single-threaded systems, increasing the difficulty of testing. Oftentimes, extensive testing at different development levels, and under a wide variety of testing conditions, helps developers feel confident that the system is unlikely to exhibit unexpected behavior when used by consumers.

Different types of software system testing are used at different stages in development. For example, source code is tested at compile time for syntactic and logical errors before being compiled into executable code. Or, system implementations, either in part or in whole, are tested by users manually affecting inputs and configurations of the system to test against expected outputs. In yet other examples, this testing is automated, using a separate software module or application to automatically run software through batteries of tests in order to more efficiently examine system behaviors under pre-determined classes of testing conditions.

Software testing is often performed with reference to a specification of behaviors for the software system being tested. This is done, for example, when the software development process involves development of a behavioral specification before a system implementation is created by writing code. By testing the implementation against the behavioral specification, errors which have been introduced during the coding process can be identified and corrected.

The behavioral specification that underlies testing may include static and/or dynamic aspects. It may give actions as static definitions that are invoked dynamically to produce discrete transitions of the system state. In this case, the specification is often called a model program. Or, the specification may define possible transitions dynamically. In this case, the specification may be called a labeled transition system, finite-state machine or method sequence chart. Either way, the behavioral specification denotes a transition system.

One important distinction in software testing is between glass-box and black-box testing. In typical glass-box testing, a test developer or automated testing software module has access to the source code for a particular module, library, or application being tested and can insert code into the implementation in order to affect execution of the implementation or receive information during execution. In this way, the code can be tested at whatever level of specificity the test developer desires. By contrast, in typical black-box testing, a tester or testing software application can only manipulate a particular system implementation through the interfaces the system presents to a user or to other pieces of software. This provides an experience closer to that of a customer, and allows the tester to focus on the ways the implementation will perform once it becomes a product.

Conformance testing is a common method of black-box testing based on an executable behavioral specification and some correctness criteria. This kind of testing checks that an implementation of a software system conforms to its system specification by executing the implementation in a test environment that is aware of the states and transitions envisioned by the specification. Conformance testing of this type is often known as "model-based testing." Oftentimes, records are made during execution of the implementation being tested which demonstrate the states and transitions that the implementation finds itself in during execution. This is sometimes called a "trace" of the execution. Conformance testing with a transition system involves checking whether an observed series of transitions in the implementation under test exists as a valid trace of the specified transition system.

The computer instructions for a software program may be performed along a single path of instructions with a single computer processor, with no other software executing concurrently. More often, however, the computer instructions execute concurrently with other threads of execution in the same software program or another software program, with a single computer processor or multiple processors, at a single site or multiple sites. Current techniques for conformance testing based on transition systems rely on the comparison of a particular interleaving of system events to a specification; typically this interleaving is obtained by simply observing events at runtime. Yet for many real-world systems, such as multi-threaded programs and distributed systems, it is not possible to directly observe a totally ordered, or serialized, sequence of system actions. This prevents existing techniques for conformance testing to be used on multi-threaded and distributed systems.

Prior techniques for conformance testing do not work well for multi-threaded or distributed software systems. These prior techniques for conformance testing of multi-threaded and distributed software systems include time-stamping and using a central event log facility.

One technique is to fully serialize the system. In such a method, a "time stamp" is given to each transition with respect to a global clock, and then transitions are sorted by time stamp. In one sense, this is equivalent to taking the position that a total ordering always existed, in other words, that only finer-grained instrumentation was needed to report the ordering of events. Modern computer hardware architectures illustrate the infeasibility of time-stamping, however. Consider a software program written for a hardware architecture in which memory writes are considered to be "in-flight" until an explicit memory-serialization operation occurs. Here the intuition of linear system time fails. During normal operation the system may never arrive at a single, stable state that can be seen uniformly by all agents. This arises from the fact that the hardware (as an abstract machine) does not respect the temporal order of reads and writes and provides different views of a given memory location depending on the context (such as CPU number) of the read operation itself. Hence, there exists no possible "time stamp" of a global clock that could serialize the actions of such computer hardware.

A second technique is to keep a centralized log of system events. In this scheme, each agent or processor reports its transitions to a central, serialized log. Unfortunately, such a global log introduces serialization of its own and therefore could materially affect the possible runs of the system. For example, in the case of multi-threaded programs, the very act of serialization by a test harness could eliminate certain classes of program errors. In other words, the act of testing the system would itself prevent some invalid behaviors from occurring. However, such errors could occur when the system was no longer under test.

What is needed are tools and techniques that facilitate testing of multi-threaded and distributed software systems.

SUMMARY

In summary, various tools and techniques described herein facilitate testing of multi-threaded and distributed software systems. For example, described tools and techniques facilitate conformance testing of a multi-threaded or distributed software system without perturbing the behavior of the software system under test. The described tools and techniques include, but are not limited to, the following.

A tool models system behavior of a multi-threaded and/or distributed software system as partially ordered events during conformance testing. For example, the modeling facilitates the conformance testing of an implementation of the software system. The modeling may include log generation for the partially ordered events, and the tool may generate fully serialized orderings of events based at least in part on the partially ordered events, multiplexing the partially ordered events into the fully serialized orderings of events.

Or, a tool creates one or more total ordering of events as follows. The tool receives multiple event logs representing a partial ordering of events performed by an implementation of a system during an execution. Each of the event logs represents a total ordering of events performed by one of multiple agents of the system. The tool multiplexes the events of the event logs into total orderings of events performed by the agents of the system.

Or, a tool tests an implementation of a system for conformance with a specification of the system, where the system comprises multiple threads. The tool creates multiple records which describe a partial ordering of multiple events performed by the threads during an execution of the implementation. The tool multiplexes one or more events of the partial ordering into a totally ordered listing and compares the totally ordered listing to the specification to evaluate conformance of the implementation with the specification.

The various techniques and tools can be used in combination or independently.

Additional features and advantages of the invention will be made apparent from the following detailed description of embodiments that proceeds with reference to the accompanying drawings.

DETAILED DESCRIPTION

The following description is directed to techniques and systems for facilitating conformance testing. For example, to test a software system, a conformance testing system generates one or more totally ordered runs of the software system from a partially ordered run observed for the software system. This facilitates conformance testing—the one or more totally ordered runs may be evaluated with reference to a specification of the expected behavior of the software system under test.

In some implementations, a conformance testing system takes as input a collection of agent runs for multiple agents. (In general, the term "agent" refers to a thread on any processor or any machine running in a system, and the term "thread" refers to any process with serial steps. One example of a thread is a conventional operating system thread.) The agent runs typically come from an observation (from execution, static analysis, other profiling, etc.) of a software system. A given agent run for an agent serially orders the steps of that agent. Collectively, however, the steps of the different agents are only partially ordered. From the globally observed partially ordered behavior of the software system, the conformance testing system (concurrently with the observation process or "off-line") puts together a serially ordered view of the steps of the multiple agents collectively, where the serially ordered view is equivalent to the observed partial order. The serially ordered view may then be evaluated.

In general, the conformance testing system may be a single software module or multiple software modules, and the various tasks of the conformance testing system may be performed concurrently or at separate times. Alternatively, one or more tasks of the conformance testing system are performed by another system or systems.

1. Example of Partial Ordering

For many real-world software systems, it is not possible to directly observe a totally ordered, or serialized, sequence of system actions. Instead, runs on such systems are typically partially ordered.

Figure 1A:
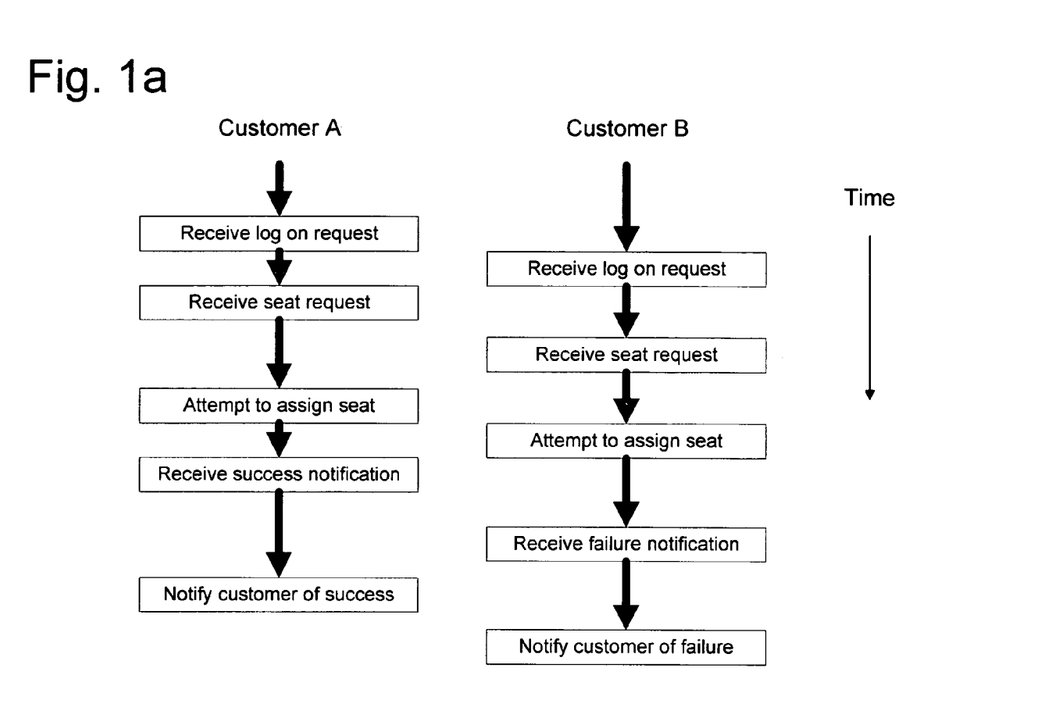
FIGS. 1a and 1b illustrate two orderings of events in a multi-threaded system.
Figure 1B:
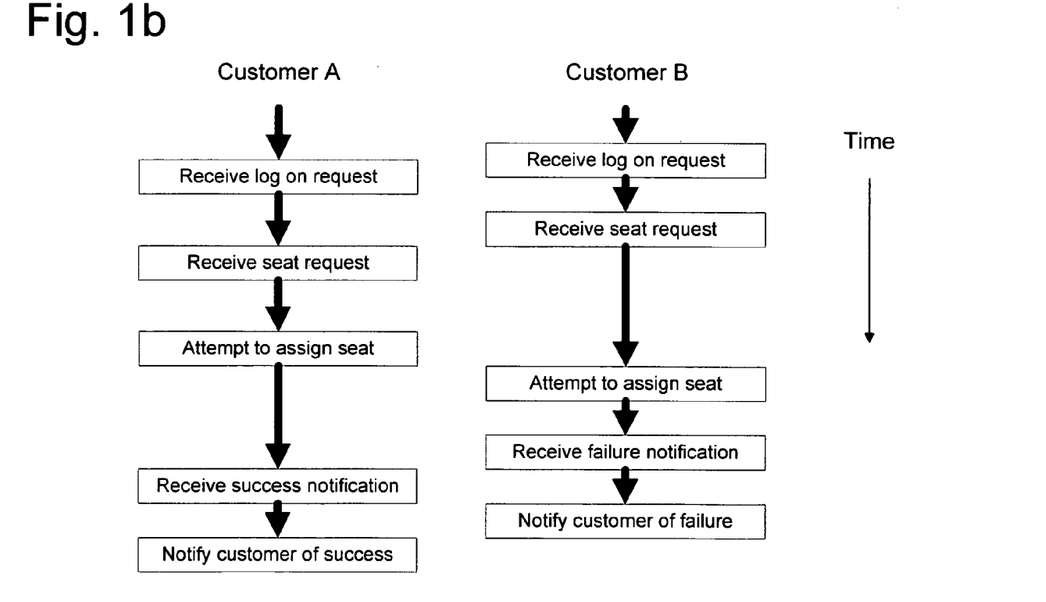

FIGS. 1a and 1b illustrate one example of such a partially ordered system. In the illustrated system, two customers are each attempting to purchase an airline seat through a World Wide Web-based airline reservation system on a flight with one remaining seat. The figures illustrate two possible executions of the system in which Customer A successfully logs on to the system, requests a seat on a particular flight, and is shown that she successfully receives the seat, while Customer B logs on, requests a seat, and is told that the requested flight is now full. The illustrated examples are given from the perspective of a thread of execution on a multi-threaded reservation system which receives remote requests from customers and which communicates with a separate seat assignment database. Of course, other implementations could exhibit the same or similar behavior. In each example, each of the reservation system threads performs the tasks of: receiving a logon request, receiving a seat request for a particular flight, attempting to assign a seat on that flight to the customer who has requested the seat, receiving of a success or failure notification from the seat assignment database, and notifying the customer of the success or failure of the reservation request.

These tasks are examples of "events," and the threads that are performing them are examples of "agents."

The two figures illustrate that, while both executions result in the same behavior, there is no clear guarantee that events performed by different agents will execute in the same order relative to each other. FIG. 1a illustrates one intuitive ordering of tasks, where every event performed by the agent serving Customer A is performed just before the agent serving Customer B performs the comparable event, effectively heading off Customer B's attempts to reserve a seat on the flight. In FIG. 1b, by comparison, the agent serving Customer B receives both Customer B's log on request and seat request before the agent serving Customer A receives the comparable information. However, for some reason, the agent serving Customer B does not attempt to assign the seat for Customer B until after the agent serving Customer A makes its seat assignment request. Possible reasons for this behavior might be that the agent serving Customer B is handling more requests than the agent serving Customer A, is experiencing network difficulties, or is running on slower hardware; the exact cause is, in fact, immaterial if the agent is still performing in conformance with its specification. FIG. 1b also shows that the agent serving Customer A receives its notification of success after the agent serving Customer B receives a notification of failure to make the reservation. Again, while this behavior may be explained by network lag or database behavior, it may be immaterial to the question of whether the agent is performing in conformance with its specification.

In the examples of FIGS. 1a and 1b, however, there is one ordering that is material, which is the attempt to assign a seat on the requested flight. This is because, in the example given, the first agent to request a seat gets the last seat on the flight, and so the second agent to request must receive a failure notification. Thus, while many of the events performed by the different agents can be performed at different times relative to each other, the behaviors exhibited in FIGS. 1a and 1b both show that the agent of Customer A requests the seat before the agent of customer B does. Events performed by both agents, while not totally ordered, do exhibit a partial ordering. Agent A events are ordered relative to Agent A events, and Agent B events are ordered relative to Agent B events, but there may be many possibilities for allowable total orderings when events of both agents are combined. Certain identified events (but not necessarily all events) of a given agent should be performed before certain identified events of another agent in order to achieve similar outcomes.

2. Multiplexing Framework Overview and Applications

One of the main applications of the techniques described herein is in the context of testing multi-threaded systems (e.g., concurrent processing with a single shared memory) and distributed systems (e.g., concurrent processing in separate memories with message passing between processors). Multi-threaded systems with shared memory are sometimes called concurrent systems. The runs of multi-threaded or distributed systems are often only partially ordered.

The conformance testing systems described herein include an agent event log creator and/or multiplexing event serializer. The multiplexing event serializer utilizes event logs for tested agents to create one or more serialized event listings from the partial ordering which can then be tested for conformance against a system specification. The multiplexing event serializer does this, for example, by non-deterministically choosing events from event queues created from event logs, according to a partial ordering of transitions of the software system represented by the event logs and relations between the event logs. The multiplexing event serializer is facilitated by the agent event log creator, which creates totally-ordered event logs for individual agents.

By modeling the interleaving semantics of abstract threads (or agents) and locks (for serial accesses of shared resources), a test harness may resolve the non-determinism of event ordering before passing events to a conformance engine. The implementation under test cooperates by sending events that denote the internal transitions that affect inter-thread ordering. Intuitively, these can be the locking/unlocking events for shared resources.

The agent event log creator thus also includes ordered records of accesses to resources (e.g., locks) shared by the agents, which serve to create a partial ordering of events which cause system transitions. When inter-thread ordering constraints have been encoded into the event data for each thread (for example, by step counts of the resource locks), events can be chosen fairly among queues in a way that satisfies the event ordering constraints. Multiplexing may then occur by choosing from per-thread event queues in a way that does not violate the inter-thread ordering constraints.

By using multiple, single-agent event logs (which are individually totally ordered) along with the partial ordering provided by comparisons of accesses to shared resources, the multiplexer can create one or more serialized event orderings (each satisfying the partial ordering) separately from the execution of the system. These serialized event orderings can be thought of as multiple different "views" of system behavior that are consistent with the system's ordering constraints, as represented in the partial ordering. Each such "serial view" can be validated through a conformance checking process that verifies the absence of behavioral discrepancies with respect to the specification.

If it is impossible to choose events in a way that satisfies the inter-thread ordering constraints, then a test failure occurs. The system has reported contradictory ordering constraints.

The following description presents exemplary applications of these techniques in a computer system.

3. Examples of the Agent Event Log Creator and Multiplexing Event Serializer

Figure 2:
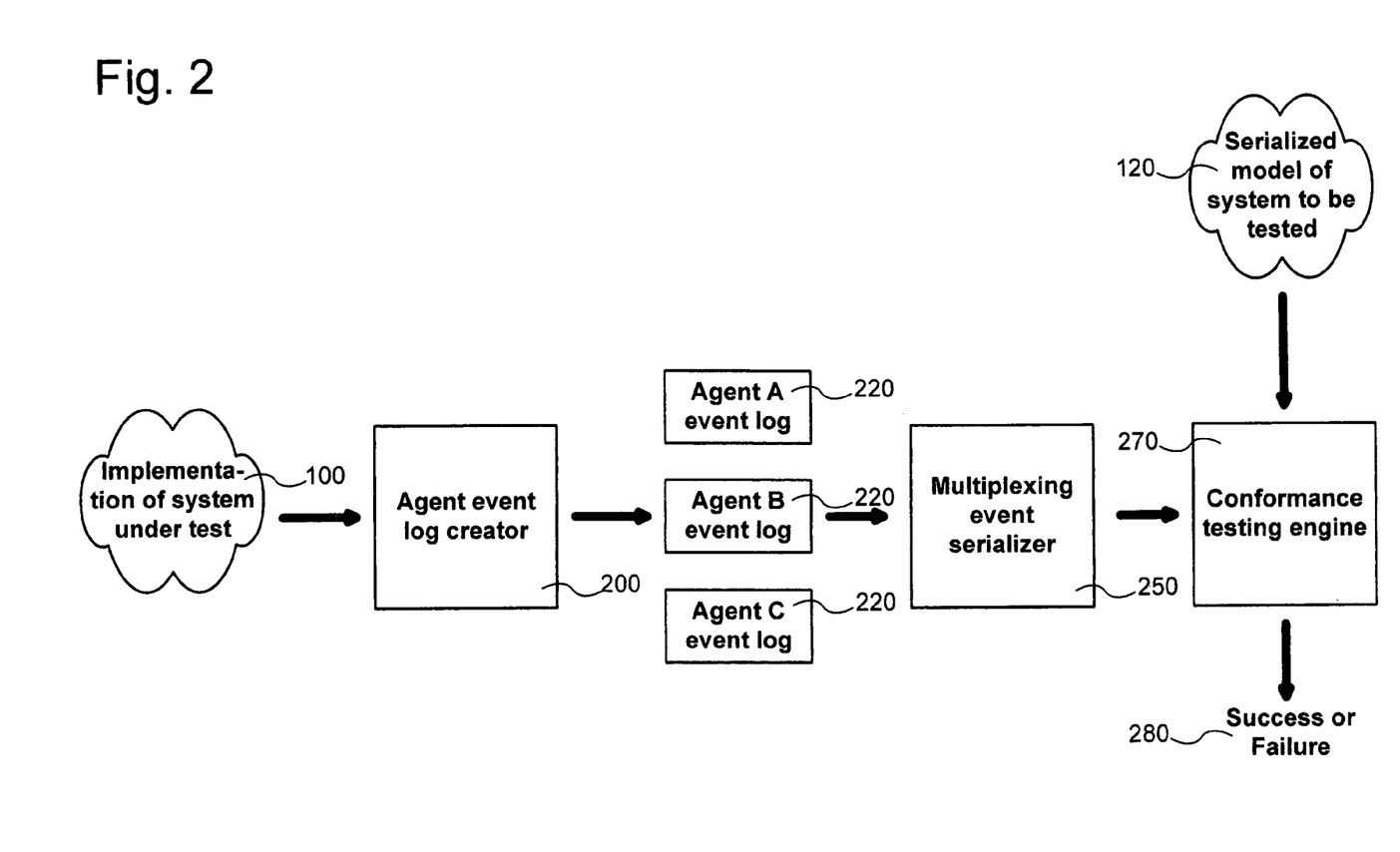
FIG. 2 is a block diagram of an agent event log creator and a multiplexing event serializer used to perform conformance testing.

FIG. 2 illustrates a generalized diagram of an agent event log creator 200 and a multiplexing event serializer 250 in a computer system. In various implementations, modules illustrated in FIG. 2 may be combined, subdivided, or omitted altogether. FIG. 2 illustrates the interactions between the implementation of the system that is to be tested 100, the log creator 200, the multiplexing event serializer 250 and a conformance testing engine 270. In FIG. 2 the system implementation 100 works in conjunction with the agent event log creator 200, which creates multiple agent event logs 220.

In some implementations, this creation is performed by executing the system implementation 100 while the event log creator 200 observes. The event logs 220 are created by observing transitions made by agents in the system 100 and by accesses to resources shared by agents in the system 100. For example, in the airplane seat reservation system mentioned previously, the event log creator 200 might create an event log for each of the two users.

In other implementations, the agent event log creator 200 is utilized to instrument the system 100 to cause agents in the system 100 to create and maintain the agent logs 220 during execution. Separate monitoring of the system 100 is not required, but the code of the system is changed in order to allow the instrumentation to be added, or instrumentation is added around code. For example, the instrumentation may be added to programming language code before compilation or, alternatively, may be added to compiled machine code or, alternatively, may be added as one or more instrumentation "wrapper" layers around executable code modules. Exemplary processes of event log creation are discussed further below with reference to FIG. 5.

FIG. 2 also illustrates that after creation, the agent event logs 220 are then passed to a multiplexing event serializer 250, which creates one or more serialized event listings (not illustrated in FIG. 2) to be used in conformance testing. Example processes of creating serialized event listings are described in further detail below with reference to FIG. 7. Once one or more serialized event listings are created, they are given to the conformance testing engine 270, which compares them to a serialized model 120 of the system being tested, and then produces an indication of success or failure 280. In some implementations, the multiplexing event serializer is combined with the conformance testing engine and event logs are multiplexed and immediately tested against a specification. Alternatively, they are separate software modules or applications and/or testing occurs later.

Implementations may also differ on what is produced by the multiplexing event serializer 250 and requirements for a successful conformance test. For example, the multiplexing event serializer may exhaustively construct and verify every valid serialized ordering which is consistent with the partial ordering inherent in the event logs. Or, instead of producing every possible ordering, one or more serializations may be produced as representatives. It may also be impossible or impracticable to produce every possible full serialized event ordering, which would necessitate the selection of a subset of possible event orderings. In another example, production of every possible serialization may not increase the likelihood of finding more errors, making exhaustion unnecessary.

If it is impossible to produce any serialized ordering of events, however, an explanation is a logical inconsistency in the implementation under test. Thus, in some implementations, an error message reporting such an inconsistency is produced if the multiplexing event serializer 250 discovers that there is no possible serialized ordering of the events described as a partial ordering in the event logs. Such a situation would also indicate that the implementation 100 fails the conformance test, since the existence of a serialized model 120 implies there must be at least one possible serialized ordering of events performed by a conforming system. A successful test is achieved when every serialization of events created from the partial ordering checks successfully against the specification 120 and no serialization checks unsuccessfully. If any of the created serializations fails to successfully check against a specification, an error in the implementation being tested is detected, and, typically, reported.

Figure 3:
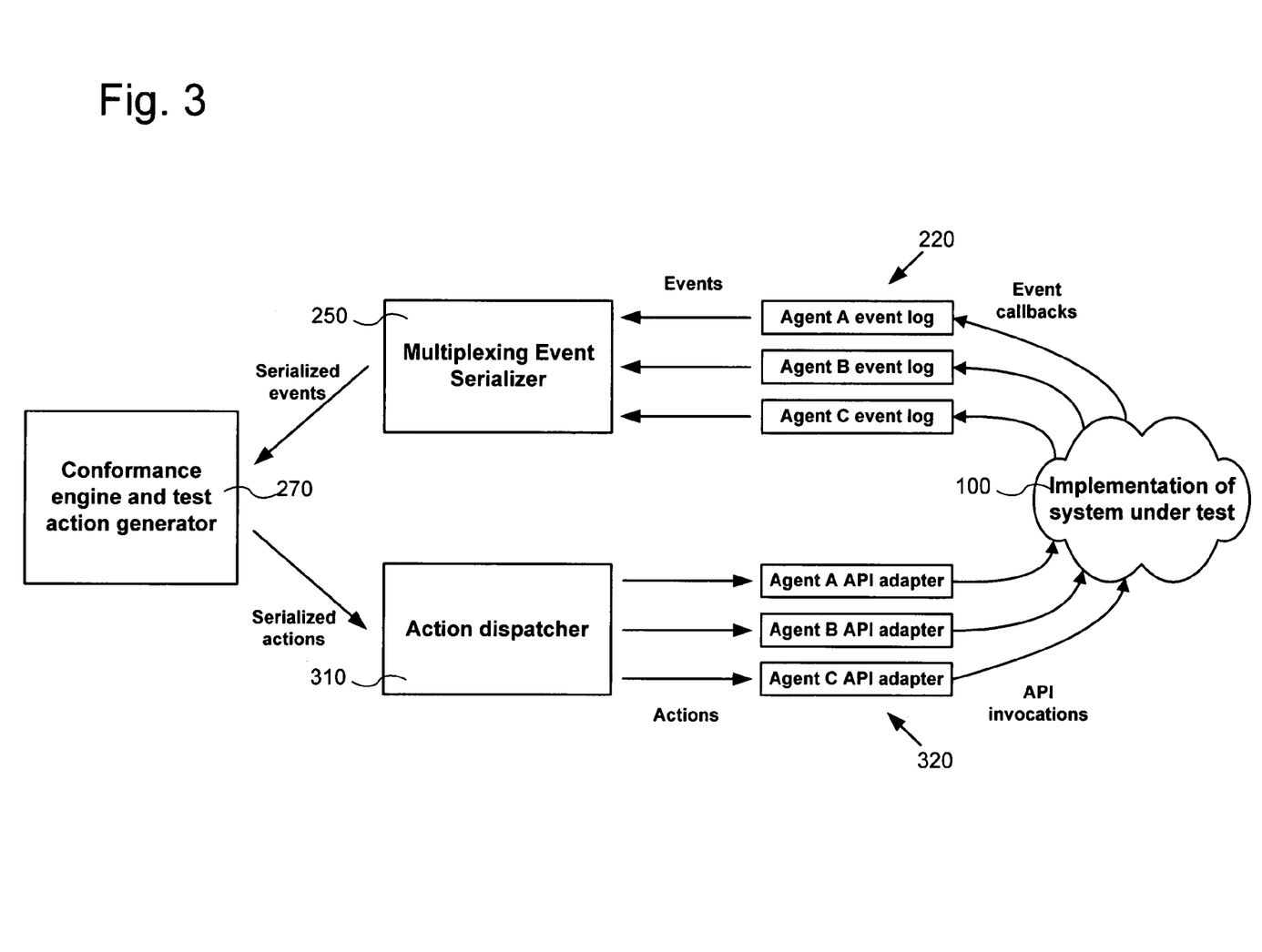
FIG. 3 is a block diagram of a conformance testing framework using the agent event logs and event serializer system of FIG. 2.

FIG. 3 is a generalized diagram of a system for utilizing the multiplexing event serializer 250 and the conformance engine 270 to check multiple serializations of a partially ordered ordering of system events using a conformance engine. In FIG. 3, from an implementation of the system 100, multiple agent event logs 220 are created during or after execution. These logs 220 are then analyzed by the multiplexing event serializer 250 in order to create serialized event orderings which are checked for conformity against a specification model by the conformance engine 270. If any of the serialized event orderings fail, the conformance engine 270 reports that the implementation 100 has failed the test. If however, all of the serializations are successfully tested, the conformance engine 270/test action generator illustrated in FIG. 3 can then create more test actions, which may be sent to an action dispatcher 310, dispatched to API adapters 320 for each of the system's agents, and then used to programmatically control the system implementation through API invocations. While the term API can refer to an "Application Programmer's Interface," as it is used in this application it can refer generally to a programmable interface to a software system, whereby the system may be prompted to perform an action or otherwise be given input.

The techniques described herein can be used for methods of more complete testing, such as, for example, checking that all valid serializations of a partial ordering result in the same model state. This can be done off-line, for example. Tests of the implementation 100 under different conditions may be performed, with feedback received for the resulting events. This could be done by setting up the testing apparatus as is illustrated in FIG. 3, receiving serializations that result in a particular end state, using the specification to create further test conditions which should result in that same end state, and then executing the implementation again.

4. Examples of Processes of Multi-Threaded Conformance Testing

Figure 4:
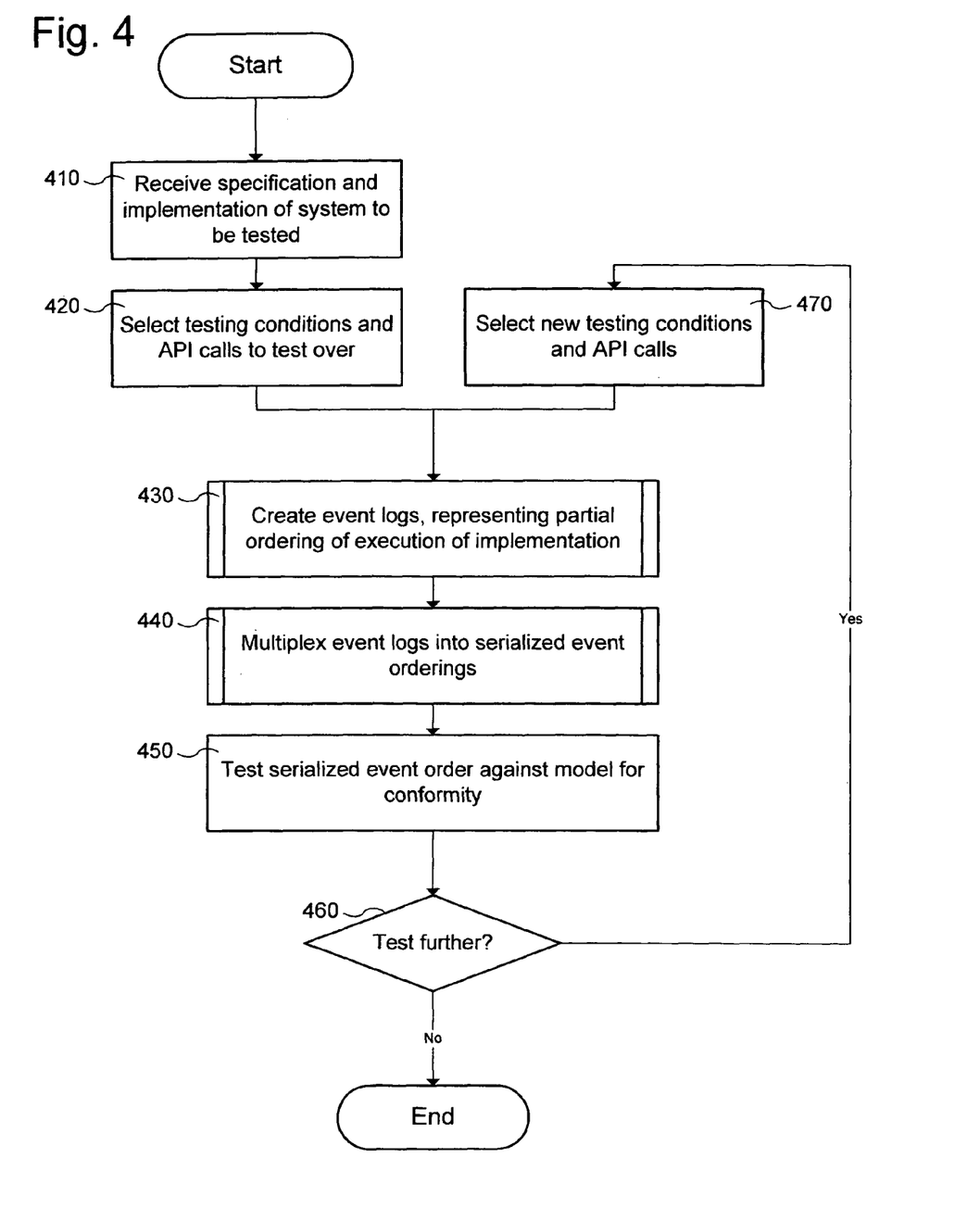
FIG. 4 is a flowchart illustrating a process performed by the systems of FIG. 2 for conformance testing a multi-threaded system.

FIG. 4 is a flowchart illustrating one example of a process for testing a multi-threaded system implementation against a specification. In various implementations, blocks illustrated in FIG. 4 may be combined, broken into sub-blocks, or omitted and the ordering of blocks may be modified. The process begins at block 410, where a model and implementation of a multi-threaded or distributed system are received for testing, along with a specification that describes how the implementation should act. The process continues to block 420, where testing conditions, such as inputs to the system, data, or human interaction with the system, are selected, and API calls are selected for which the implementation will be tested. In one implementation, these may be selected by someone testing the system; in another they may be machine-selected, as illustrated in FIG. 3.

The process then continues to block 430, where event logs are created which represent a partial ordering of an execution of the implementation. One process by which the event logs are created is described in greater detail below with respect to FIG. 5. Alternatively, another process is used to create the event logs.

The process then continues to block 440, where the event logs are multiplexed into one or more serialized event orderings. One process by which the event logs are multiplexed is described in greater detail below with respect to FIG. 7. Alternatively, another process is used to multiplex the event logs.

Next, the serialized event orderings is tested against the received model for conformance. As was discussed above, in some implementations every possible serialized event ordering is eventually created and tested, while in other implementations, a subset of all possible orderings are created and tested.

The process continues to decision block 460, where it is determined if further testing is desired. If so, at block 470, new test conditions and/or API calls are selected for testing and the process repeats. If no further testing is required, the process ends.

Figure 5:
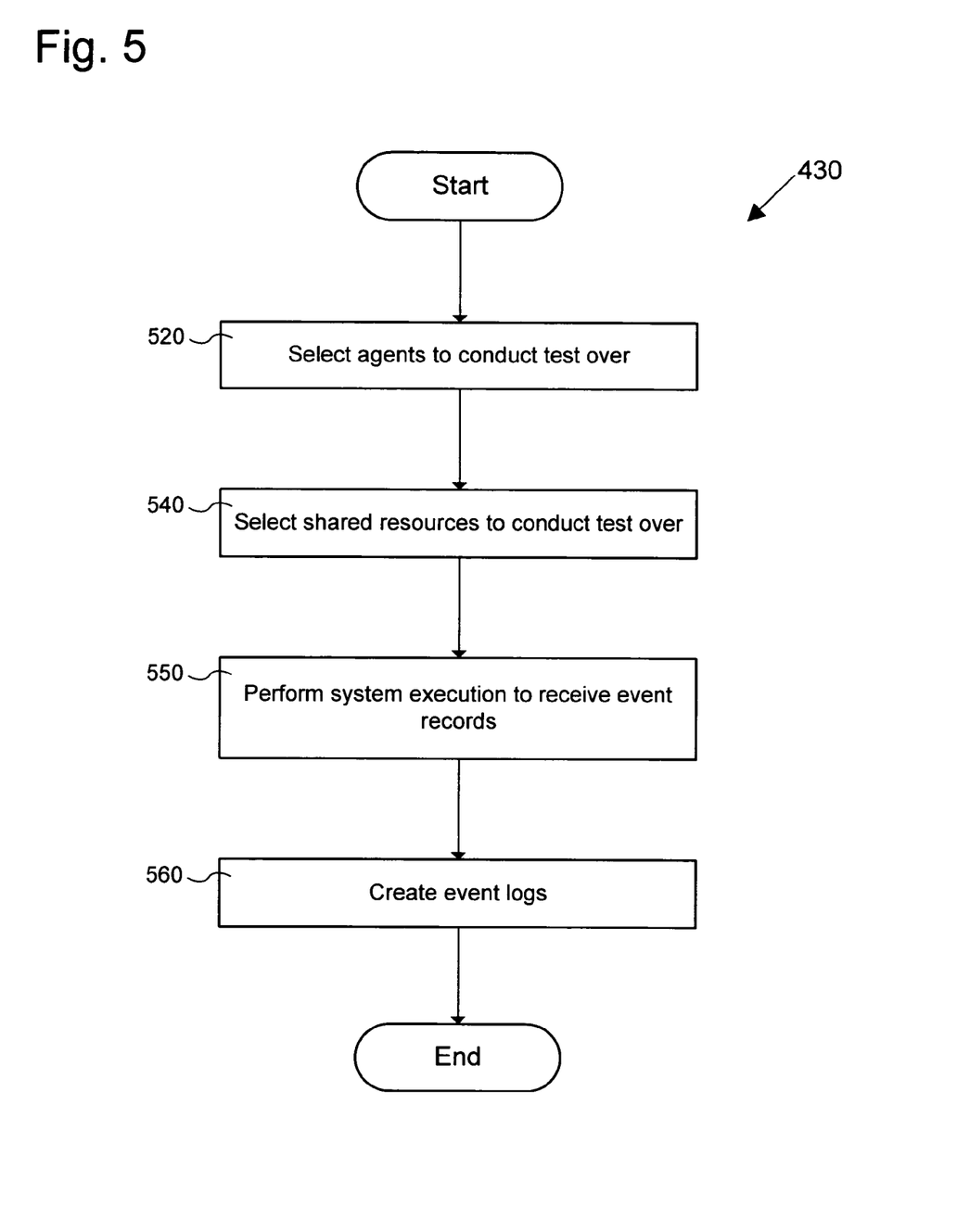
FIG. 5 is a flowchart illustrating a process performed by the agent event log creator of FIG. 2 for creating agent event logs.

FIG. 5 is a flowchart illustrating one example of the process of block 430 by which the log creator 200 creates event logs representing a partial ordering of an execution of a system implementation. In various implementations, blocks illustrated in FIG. 5 may be combined, broken into sub-blocks, or omitted and the ordering of blocks may be modified.

The process starts at block 520, where agents are selected over which the conduct will be tested. For example, every agent of the system is included in the testing, or only those agents which are expected to execute in the particular test being performed are selected. Or agents may be excluded from selection to simplify the testing process.

Next, at block 540, shared resources are selected over which the test will be conducted. A typical example of inter-thread ordering constraints arises from serial access to shared resources such as computer memory. Even when there are many threads, the order in which threads write to a particular location of memory can oftentimes be fully defined. For example, the order that resource locks are acquired and released by the various threads can be used to construct a fully serialized time line of reads and writes for the resource being locked. Locks, if associated with step counts, taken together help define a partial ordering of system runs. The same serial access can even be observed even when resources are not locked. In some implementations, the selected shared resources comprise every resource or memory location which is accessed by more than one thread at different times (in other words, a shared resource is not accessed by multiple threads simultaneously). Alternatively, only a subset of all possible shared resources is selected.

Next, at block 550, a system execution is performed using selected test conditions and API calls, event records are received which indicate events corresponding to transitions in the specification, and access records are received which represent accesses to selected shared resources. This may be performed by observing the execution of the system implementation being tested to look for transition events and shared resource accesses. Or, instrumentation is added so that the system itself logs transition events and shared resource accesses.

Finally, at block 560, event queues, or logs (for off-line analysis), are created which comprise the information received at block 550. For example, one log is created for each agent. Or, a single log is created for all agents with events organized according to agent. For individual agents, the event log or logs represent a total ordering of all transition events per agent, and the event logs, together with the record of agent accesses to shared resources, represent a partial ordering.

5. Examples of a Partial Ordering Represented by Event Logs

Figure 6:
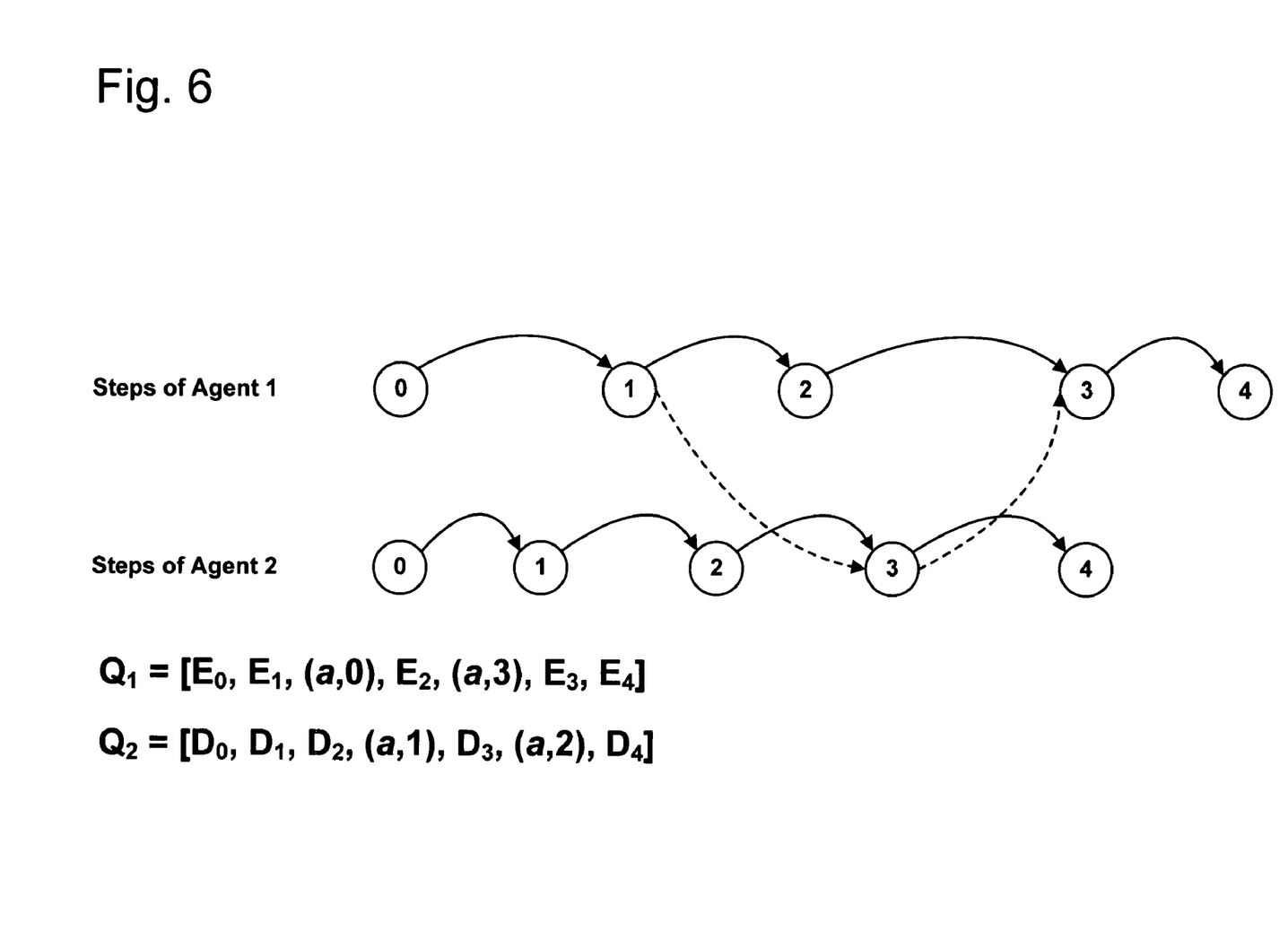
FIG. 6 illustrates a partial ordering represented in event logs for two agents in multi-threaded system.

In some implementations, orderings are maintained by numbering recorded steps or events of each agent and by keeping resource lists for shared resources. A resource list orders resource accesses according to agent and event. An example of the information stored in such event logs is illustrated in FIG. 6. FIG. 6 illustrates a partial ordering of transition events, represented by the numbered circles, for an execution of two agents which access a single shared resource, a. As FIG. 6 illustrates, the information kept about the transition events shows that each event a particular agent performs is totally ordered with respect to the other events performed by that agent. Thus, each event can be numbered with a sequential step number, and the solid lines demonstrate that each event occurs after the one to the left of it. The dotted lines represent ordering constraints that are imposed on particular events by accesses to a. Thus, for example, FIG. 6 demonstrates that in the execution that produced these event logs a was accessed by Agent 1 at Agent 1's event number 1 before it was accessed by Agent 2's event number 3. Similarly, Agent 1's access of a at its event number 3 must have taken place after Agent 2's access of a at its event number 3.

FIG. 6 also demonstrates that the information contained in the event logs may be viewed as queues, ordered by the steps of each agent. To allow the queues to maintain information about accesses to the shared resource a, information from the resource access list for a is included in the queues as well. For example, this is done by including two elements in the queue for every partial ordering which is enforced by two agents accessing a shared resource. This means that, when one agent is known to access a resource after another, an element demonstrating the access is added to the queue for the first agent, which accesses the resource after the event which accesses it. Likewise, an element indicating the access is added to the queue for the second agent before the event in which the second agent accesses the resource. In some implementations, each of these access elements is numbered with a value to record the access order in the list of accesses for that resource. These elements may be called lock events, although they are not necessarily associated with resource locks in the traditional sense.

Thus, in FIG. 6, the event log for Agent 1 provides a queue of $Q_1=[E_0, E_1, (a,0), E_2, (a,3), E_3, E_4]$, and the event log for Agent 2 provides a queue of $Q_2=[D_0, D_1, D_2, (a,1), D_3, (a,2), D_4]$. As the queues demonstrate, the transition events in each queue are maintained in a strict order. Secondly, accesses to the shared resource a are maintained in a strict order by adding ordered elements to the queue which represent the accesses. Thus, because the element $(a, 1)$ of $Q_2$ must occur after the element $(a, 0)$ of $Q_1$, the transition event $D_3$ must occur after transition event $E_1$. This preserves a partial ordering for the events being performed by the execution which is represented in the event logs. The events can then be multiplexed into a serialized ordering by a tool such as the multiplexing event serializer 250. Possible total orderings of the partial ordering illustrated in FIG. 6 would be $[D_0, E_0, E_1, D_1, E_2, D_2, D_3, E_3, D_4, E_4]$ or $[E_0, D_0, D_1, D_1, E_1, E_2, D_3, D_4, E_3, E_4]$.

6. Examples of Processes of Multiplexing Partial Orderings of Agent Events

Figure 7:
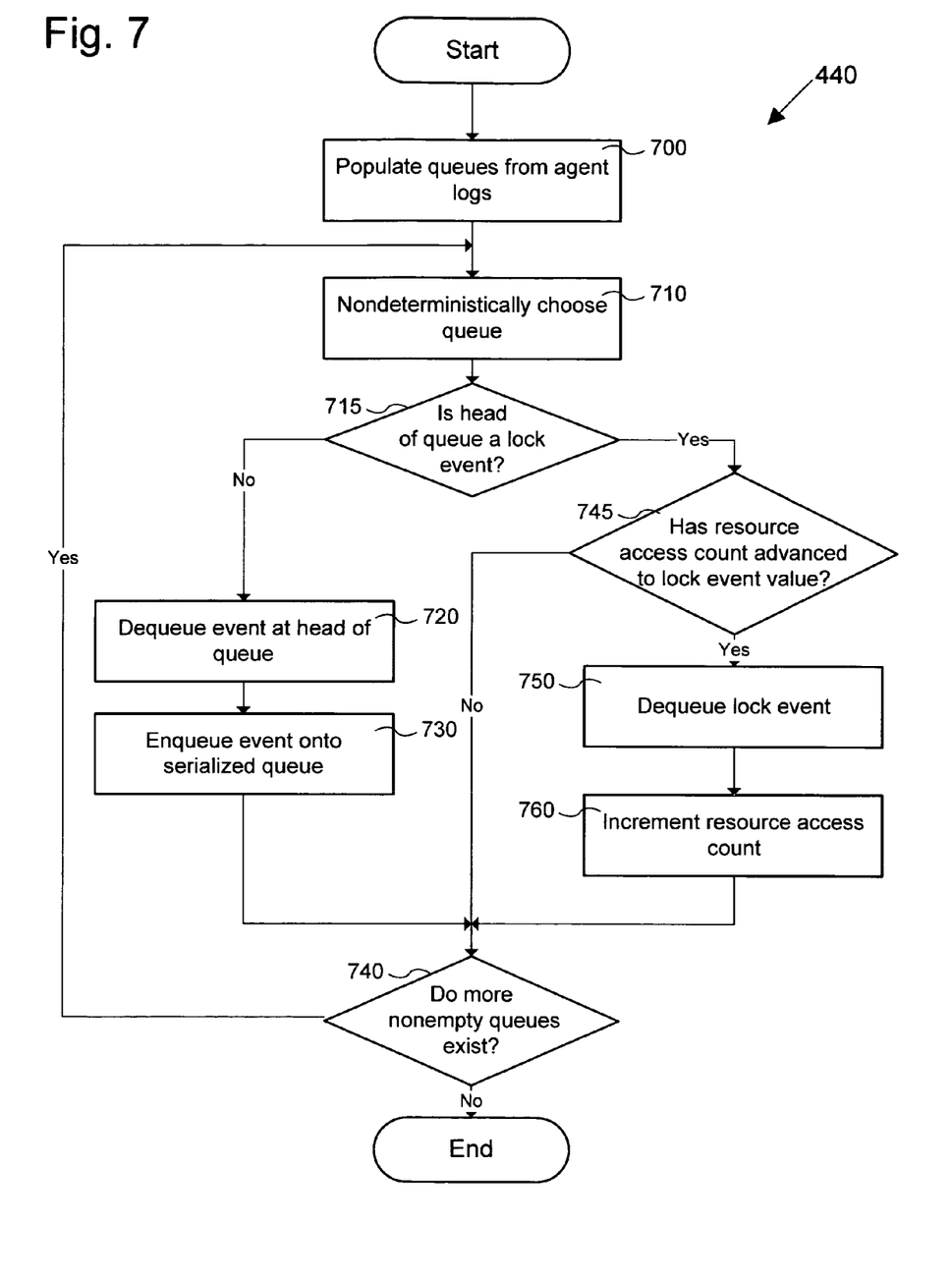
FIG. 7 is a flowchart illustrating a process performed by the multiplexing event serializer of FIG. 2 for creating a serialized event queue.

FIG. 7 is a flowchart illustrating one example of the process of block 440 by which a tool such as the multiplexing event serializer 250 creates a serial event ordering from event logs representing a partial ordering of events from an execution of the implementation being tested. In various implementations, blocks illustrated in FIG. 7 may be combined, broken into sub-blocks, or omitted and the ordering of blocks may be modified.

FIG. 7 illustrates the process with reference to a plurality of queues, each containing transition events and lock events for a particular agent. In one implementation, these comprise data structures which are populated from information received from event callbacks and/or contained in the event logs. Additionally, the serializer 250 maintains a global resource access count for each shared resource for which lock events are represented in the queues, in order to assure the ordering of accesses to the resource. Alternatively, different data structures may be used.

The process begins at block 700, where data in the queues are populated, for example, from information contained in the agent event logs. Next, at block 710, a queue is non-deterministically (randomly) chosen from the plurality of queues. The process continues to decision block 715, where the multiplexing event serializer 250 determines if the head of the chosen queue is a lock event. If not, the head is a transition event, and so the event is dequeued at block 720 and enqueued onto a serialized queue at block 730, which will eventually become the serialized event queue output by the serializer 250. The process then continues to decision block 740, where it is determined if there are still nonempty queues. If so, the process returns to block 710 and repeats.

If, however, at decision block 715, the head of the queue is found to be a lock event, the process continues to decision block, 745, where the value of the lock event is compared to the global resource access count for the shared resource referenced by the lock event. If the global resource access count has not yet advanced to the lock event value, then the partial ordering represented in the queues prevents any further events in the selected queue from occurring. Thus, the process continues to block 740 and repeats. If the global resource access count has advanced to the lock event value, however, the process continues to block 750, where the lock event is dequeued, allowing later transition events in the queue to be serialized subsequently. The process then increments the resource access count for the dequeued lock event at block 760 before proceeding to decision block 740 to continue for any extant queues. Alternatively, the repetitive process of FIG. 7 may be terminated before fully serializing a partially ordered set of events, for example if the serialization yet achieved is useful for testing purposes.

7. Exemplary Multiplexing Implementation

One exemplary implementation of the multiplexing framework is described herein using the modeling language AsmL. One definition for the language is found in Microsoft Research Technical Report MSR-TR-2004-27. The algorithm and AsmL code presented herein are merely for purposes of example and should not be taken to exclude other implementations or methods of encoding the techniques described above.

The input to the multiplexer algorithm can be represented as a set of queues, where each queue is associated with a particular agent. The output of the algorithm is a single output queue of events that corresponds to a possible serialization of the events described in the input queues. The following pseudocode describes a set of input queues ("inQueues") and an output queue ("outQueue").

```
type Queue
    var inQueues as Set of Queue
    var outQueue as Queue
```

The entries of an input queue are events, where an event is a lock event or a transition/update event. A lock event is associated with a given shared resource access and a count for that access.

```
type Lock
structure Event
    case LockEvent
        Lock lock
        int count
    case UpdateEvent
```

The details of a queue are left abstract; the following operations on a queue are assumed to be available for the purpose of this example: add a new event at the end (tail) of the queue by invoking Enqueue; remove the first event (at the head of the queue) by invoking Dequeue; check if the queue is empty by invoking IsEmpty; and get the first event from the queue by invoking Head. The following pseudocode describes these four operations.

```
class Queue
    IsEmpty( ) as Boolean
    Enqueue(event as Event)
    Dequeue( )
    Head( ) as Event
```

The algorithm keeps a map from shared resources (e.g. locks) to resource access counts (e.g. lock counts). Initially the map is empty, so the expected access count of each lock event is initially 0. The following pseudocode shows a declaration for the map ("locks") of resources to access count values and also shows methods for getting and incrementing counts.

```
locks as Map of Lock to int = {->}
GetAccessCount(lock as Lock) as int
    if lock notin locks then return 0
    else return locks(lock)
IncrementAccessCount(lock as Lock)
    if lock notin locks then locks(lock) := 1
    else locks(lock) := locks(lock) + 1
```

The main loop of the algorithm is described by the following fragment of AsmL. A queue is chosen arbitrarily. If the first event in the chosen event queue is a lock event with an access count that matches the count expected for the associated resource (as indicated in the map), then the lock event is removed from the chosen input queue and the resource access count for the resource is incremented. On the other hand, if the first event in the chosen input queue is a transition event, the transition event is removed from the chosen input queue and appended at the end of the outgoing queue. The lock events are not added to the outgoing queue, but are instead used for the purposes of ordering the transition events.

```
while true
    choose queue in inQueues where not queue.IsEmpty( )
        let e = queue.Head( )
        if e is LockEvent then
            if e.count = GetAccessCount(e.lock) then
                queue.Dequeue( )
                IncrementAccessCount(e.lock)
            else
                skip
        else
            queue.Dequeue( )
            outQueue.Enqueue(e)
    ifnone //if there is no nonempty queue to be chosen do nothing
        skip
```

This example is a simplified version of possible implementations. Implementations can be multi-threaded, where the incoming queues may be updated while the multiplexer is running. In some implementations, the number of input queues may grow or shrink dynamically as the number of agents changes.

8. Computing Environment

The above described techniques and systems (including the agent event log creator 200 and/or multiplexing event serializer 250) can be implemented on any of a variety of computing devices and environments, including computers of various form factors (personal, workstation, server, handheld, laptop, tablet, or other mobile), distributed computing networks, and Web services, as a few general examples. The systems can be implemented in hardware circuitry, as well as in software 880 executing within a computer or other computing environment, such as shown in FIG. 8.

Figure 8:
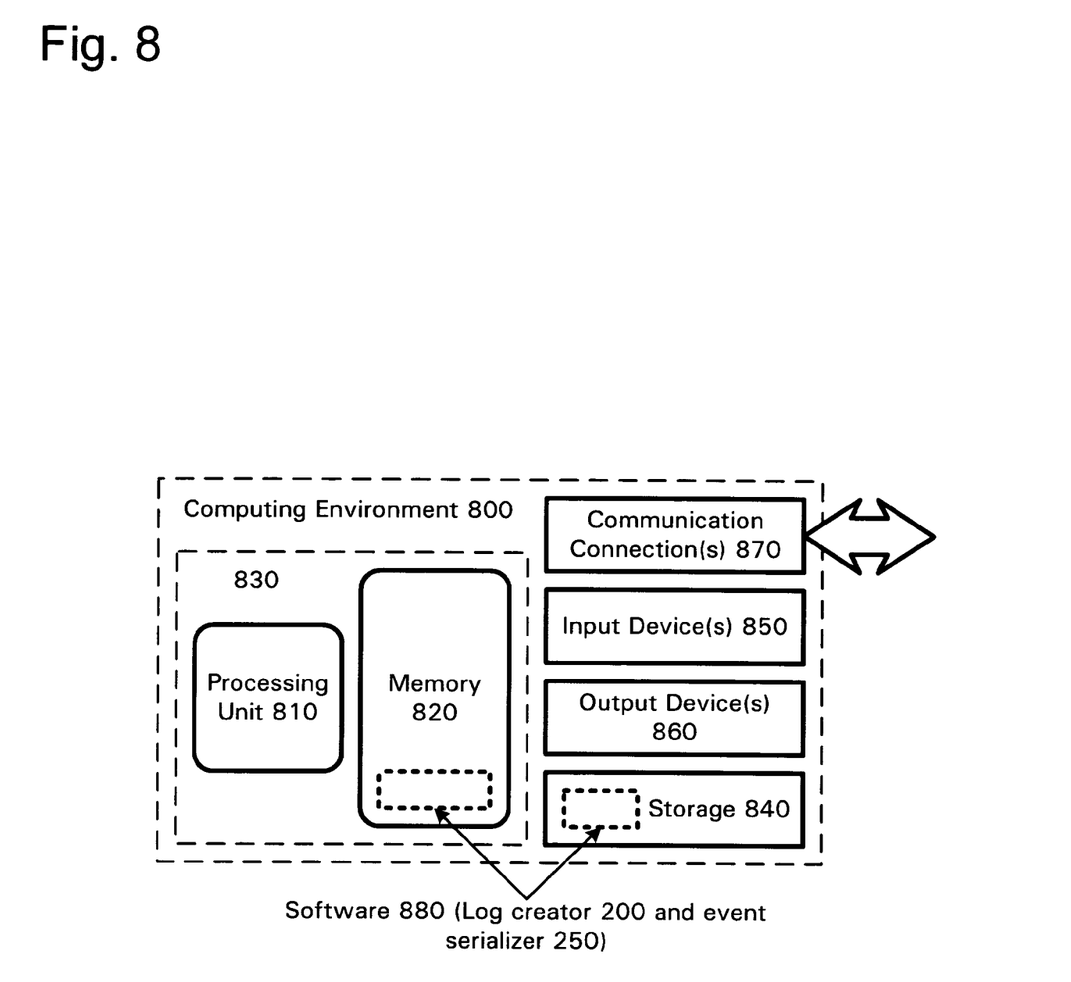
FIG. 8 is a block diagram of a suitable computing environment for implementing the systems of FIG. 2.

FIG. 8 illustrates a generalized example of a suitable computing environment 800 in which the described techniques can be implemented. The computing environment 800 is not intended to suggest any limitation as to scope of use or functionality of the invention, as the present invention may be implemented in diverse general-purpose or special-purpose computing environments.

With reference to FIG. 8, the computing environment 800 includes at least one processing unit 810 and memory 820. In FIG. 8, this most basic configuration 830 is included within a dashed line. The processing unit 810 executes computer-executable instructions and may be a real or a virtual processor. In a multi-processing system, multiple processing units execute computer-executable instructions to increase processing power. The memory 820 may be volatile memory (e.g., registers, cache, RAM), non-volatile memory (e.g., ROM, EEPROM, flash memory, etc.), or some combination of the two. The memory 820 stores software 880 implementing, for example, the log creator 200 and the event serializer 250.

A computing environment may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The storage 840 may be removable or non-removable, and includes magnetic disks, magnetic tapes or cassettes, CD-ROMs, CD-RWs, DVDs, or any other medium which can be used to store information and which can be accessed within the computing environment 800. The storage 840 stores instructions for the software 880.

The input device(s) 850 (e.g., for devices operating as a control point in the log creator 200 and the event serializer 250) may be a touch input device such as a keyboard, mouse, pen, or trackball, a voice input device, a scanning device, or another device that provides input to the computing environment 800. For audio, the input device(s) 850 may be a sound card or similar device that accepts audio input in analog or digital form, or a CD-ROM reader that provides audio samples to the computing environment. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The event log creation and serial event multiplexing techniques and tools presented herein can be described in the general context of computer-readable media. Computer-readable media are any available media that can be accessed within a computing environment. By way of example, and not limitation, with the computing environment 800, computer-readable media include memory 820, storage 840, communication media, and combinations of any of the above.

The techniques and tools presented herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

In view of the many possible embodiments to which the principles of our invention may be applied, we claim as our invention all such embodiments as may come within the scope and spirit of the following claims and equivalents thereto.

We claim:

1. A method comprising:
    during conformance testing:
        executing an implementation of a multi-threaded and/or distributed software system under test, the software system comprising a plurality of agents;
        modeling system behavior during execution of the implementation of the software system as partially ordered events by, during execution, recording a plurality of agent runs for agents in the implementation of the software system under test, wherein each agent run of the plurality of agent runs logs:
            (a) a plurality of events executed by the respective agent of the agent run in the order executed by the respective agent, and
            (b) one or more accesses to a shared resource, each of the one or more accesses to the shared resource having an order value that indicates an order of access to the shared resource by any of the plurality of agents; and
        generating one or more fully serialized orderings of events based at least in part on the partially ordered events by multiplexing the logged events in the plurality of agent runs according to constraints indicated by the logged accesses to the shared resource into the one or more fully serialized orderings of events.

2. The method of claim 1, further comprising, during the conformance testing:
    comparing the generated one or more fully serialized ordering of events to a specification to determine if the implementation is acting in conformance with the specification.

3. The method of claim 1, wherein the recording a plurality of agent runs for agents comprises log generation for the partially ordered events.

4. The method of claim 3, wherein the log generation for the partially ordered events comprises creating a plurality of event logs for the plurality of agents which describe the logged events performed by the agents during the execution of the implementation of the software system.

5. The method of claim 4, wherein the creating the plurality of event logs for the plurality of agents comprises:
    selecting the shared resource; and
    observing the accesses to the shared resource to determine the partial ordering of the logged events based on the order in which the shared resource is accessed by the plurality of agents.

6. The method of claim 1, wherein the recording a plurality of agent runs for agents comprises:
    creating a plurality of event logs for the plurality of agents which describe the logged events performed by the plurality of agents during the execution of the implementation of, the software system; and
    creating a plurality of queues from the plurality of event logs;
    wherein:

each of the plurality of queues represents a total ordering of events performed by one agent of the plurality of agents;

each element in the plurality of queues represents a transition event for one of the plurality of events or represents one of the one or more accesses to the shared resource; and for each element that represents one of the one or more accesses to the shared resource, the order value associated with that access denotes the point at which that access was made relative to other accesses to the shared resource being accessed.

7. The method of claim 6, wherein transition events represent transitions between nodes in a state model which describes a specification of the software system.

8. The method of claim 1, wherein the multiplexing the logged events includes:

keeping a global resource access count for the shared resource;

selecting a queue from among one or more queues for the partially ordered events;

when the head of the selected queue is an update event element representing one of the logged events, dequeuing the update event element and adding the update event element to one of the one or more fully serialized orderings of events;

when the head of the selected queue is an access element associated with one of the one or more accesses to the shared resource and the order value of the access associated with the access element is equal to the global resource access count kept for the shared resource, dequeuing the access element and incrementing the global resource access count associated; and repeating the selecting, the dequeuing and adding, and the dequeuing and incrementing until the serialized ordering achieves a desired length.

9. The method of claim 1, further comprising producing one or more computer-readable media containing computer-executable instructions which comprise an implementation of the software system.

10. The method of claim 1, wherein the multiplexing includes ordering the logged events from the plurality of agent runs so that events from one agent run that are logged before an access to the shared resource with a first order value are ordered before events from other agent runs that are logged after accesses to the shared resource with higher order values.

11. A method of creating one or more total orderings of events, the method comprising:

receiving a plurality of event logs representing a partial ordering of events performed by an implementation of a system during an execution, wherein each of the plurality of event logs represents a total ordering of events performed by one of a plurality of agents of the system, the plurality of event logs including ordering constraints, wherein the ordering constraints indicate one or more accesses to a shared resource during the execution, each of the one or more accesses to the shared resource having an order value that indicates an order of access to the shared resource by any of the plurality of agents; and multiplexing the events of the plurality of event logs into one or more total orderings of events performed by the plurality of agents of the system, wherein each of the total orderings comprises a serially-ordered view of the events performed by the plurality of agents of the system, and wherein the multiplexing includes ordering events from the plurality of event logs, according to the ordering constraints.

12. The method of claim 11, wherein:

the plurality of event logs are partially ordered by reference to the shared resource;

the plurality of event logs maintain, as part of the logged events, records of events performed by each of the plurality of agents which correspond to transitions within a state model; and the plurality of event logs further maintain, as reflected in the ordering constraints, records of accesses to the shared resource by the plurality of agents.

13. The method of claim 12, wherein the multiplexing the events of the plurality of event logs comprises maintaining a global resource access count for the shared resource which denotes the number of times the shared resource has been accessed by the plurality of agents.

14. The method of claim 11, wherein the one or more total orderings of events do not represent every event maintained in the plurality of event logs.

15. One or more computer-readable storage containing instructions, which, when executed by a computer, cause the computer to perform a method of testing an implementation of a system comprising plural threads, for conformance with a specification of the system, the method comprising:

executing the implementation of the system;

during execution, creating plural records which describe a partial ordering of plural events performed by the plural threads during execution of the implementation, wherein the creating plural records comprises:

observing events performed by each of the plural threads during execution; and observing accesses to one or more resources shared by the plural threads during execution to determine the partial ordering based at least in part on the order in which the one or more resources are accessed;

multiplexing one or more events of the partial ordering of plural events performed during the execution of the implementation into a totally ordered listing, the multiplexing comprising:

creating plural input queues from the plural records; and using an access count for each of the one or more shared resources to regulate dequeuing from the plural input queues and enqueuing to an output queue for the totally ordered listing; and comparing the totally ordered listing to the specification to evaluate conformance of the implementation with the specification.

16. The computer-readable storage of claim 15, wherein:

each of the plural input queues describes a total ordering of events performed by one of the plural threads;

each element in the plural input queues represents a transition event or an access to one of the one or more shared resources; and each element representing an access has a lock value, which denotes the point at which that access was made relative to other accesses to the resource being accessed.

17. The computer-readable storage of claim 15, wherein the method further comprises producing one or more other computer-readable media containing computer-executable instructions which comprise the tested implementation.

* * * * *

UNITED STATES PATENT AND TRADEMARK OFFICE
CERTIFICATE OF CORRECTION

| | | |
|---|---|---|
| PATENT NO. | : 7,747,985 B2 | Page 1 of 1 |
| APPLICATION NO. | : 11/085624 | |
| DATED | : June 29, 2010 | |
| INVENTOR(S) | : Colin L. Campbell et al. | |

It is certified that error appears in the above-identified patent and that said Letters Patent is hereby corrected as shown below:

In the Claims:
In column 14, line 64, in Claim 6, delete "of," and insert -- of --, therefor.

Signed and Sealed this
Twenty-fifth Day of January, 2011

David J. Kappos
*Director of the United States Patent and Trademark Office*